US007007993B2

(12) United States Patent
Kubota

(10) Patent No.: US 7,007,993 B2
(45) Date of Patent: Mar. 7, 2006

(54) CENTER CONSOLE

(75) Inventor: Norio Kubota, Shioya-gun (JP)

(73) Assignee: TS Tech Co., Ltd., Asaka (JP)

( * ) Notice: Subject to any disclaimer, the term of this patent is extended or adjusted under 35 U.S.C. 154(b) by 0 days.

(21) Appl. No.: 10/938,726

(22) Filed: Sep. 13, 2004

(65) Prior Publication Data

US 2005/0082860 A1 Apr. 21, 2005

(30) Foreign Application Priority Data

Oct. 16, 2003 (JP) .............................. 2003-356853

(51) Int. Cl.
*B60R 27/00* (2006.01)
(52) U.S. Cl. ................................................. 296/24.34
(58) Field of Classification Search ............ 296/24.34, 296/24.3, 24.44, 24.46, 37.1, 37.5, 37.8, 296/37.9, 37.14; 224/400, 275, 281, 282, 224/495, 496, 497, 498, 499, 502; 220/500, 220/200
See application file for complete search history.

(56) References Cited

U.S. PATENT DOCUMENTS

| 698,558 | A | * | 4/1902 | Rosenbaum | ................. | 190/111 |
| 3,022,107 | A | * | 2/1962 | Daniels | ..................... | 296/37.8 |
| 3,177,033 | A | * | 4/1965 | Daniels | ..................... | 296/37.8 |
| 4,934,750 | A | * | 6/1990 | Eichler et al. | ............. | 296/37.8 |
| 4,974,765 | A | * | 12/1990 | Marchetto et al. | ......... | 224/275 |
| 5,884,799 | A | * | 3/1999 | Korber et al. | .............. | 220/348 |
| 6,045,173 | A | * | 4/2000 | Tiesler et al. | .............. | 296/37.8 |
| 6,059,243 | A | * | 5/2000 | Hikage et al. | ........... | 248/311.2 |
| 6,168,059 | B1 | * | 1/2001 | Salenbauch et al. | ........ | 224/539 |
| 6,478,204 | B1 | * | 11/2002 | Lange et al. | ................ | 224/539 |
| 6,499,785 | B1 | * | 12/2002 | Eguchi | ...................... | 296/37.8 |
| 6,634,690 | B1 | * | 10/2003 | Schaal | ....................... | 296/37.1 |
| 6,655,561 | B1 | * | 12/2003 | Panhelleux et al. | ......... | 224/275 |
| 6,719,344 | B1 | * | 4/2004 | Ono et al. | ............... | 296/24.34 |
| 6,719,367 | B1 | * | 4/2004 | Mic et al. | ............. | 297/188.19 |
| 6,726,267 | B1 | * | 4/2004 | Kim et al. | ................ | 296/37.8 |
| 6,866,319 | B1 | * | 3/2005 | Hupfer | ..................... | 296/37.8 |
| 2003/0085245 | A1 | * | 5/2003 | Chiku | ....................... | 224/275 |
| 2005/0035618 | A1 | * | 2/2005 | Toth et al. | ............... | 296/24.34 |
| 2005/0052044 | A1 | * | 3/2005 | Toyota et al. | ............ | 296/24.34 |

FOREIGN PATENT DOCUMENTS

JP          A 07-315097          12/1995

* cited by examiner

*Primary Examiner*—H. Gutman
(74) *Attorney, Agent, or Firm*—Oliff & Berridge PLC

(57) ABSTRACT

A center console at a walk-through between seats which is held to be parallel to a horizontal surface in use, and is rotatable to be vertical to the horizontal surface when not in use, has: a storing part having an opening at an upper portion; a cover for closably covering the opening; rail members to support the cover to be slidable; and frame bodies for supporting the rail members, wherein the frame body has: a side surface portion which covers a side surface of the rail member; and an extending portion which extends inwardly from an upper end of the side surface portion and a tip end portion of which is bent downward, the side surface portion including a lower engaging piece engaging with a lower portion of the rail member, and the portion bent downward including an upper engaging piece engaging with an upper portion of the rail member.

9 Claims, 10 Drawing Sheets

FIG.3
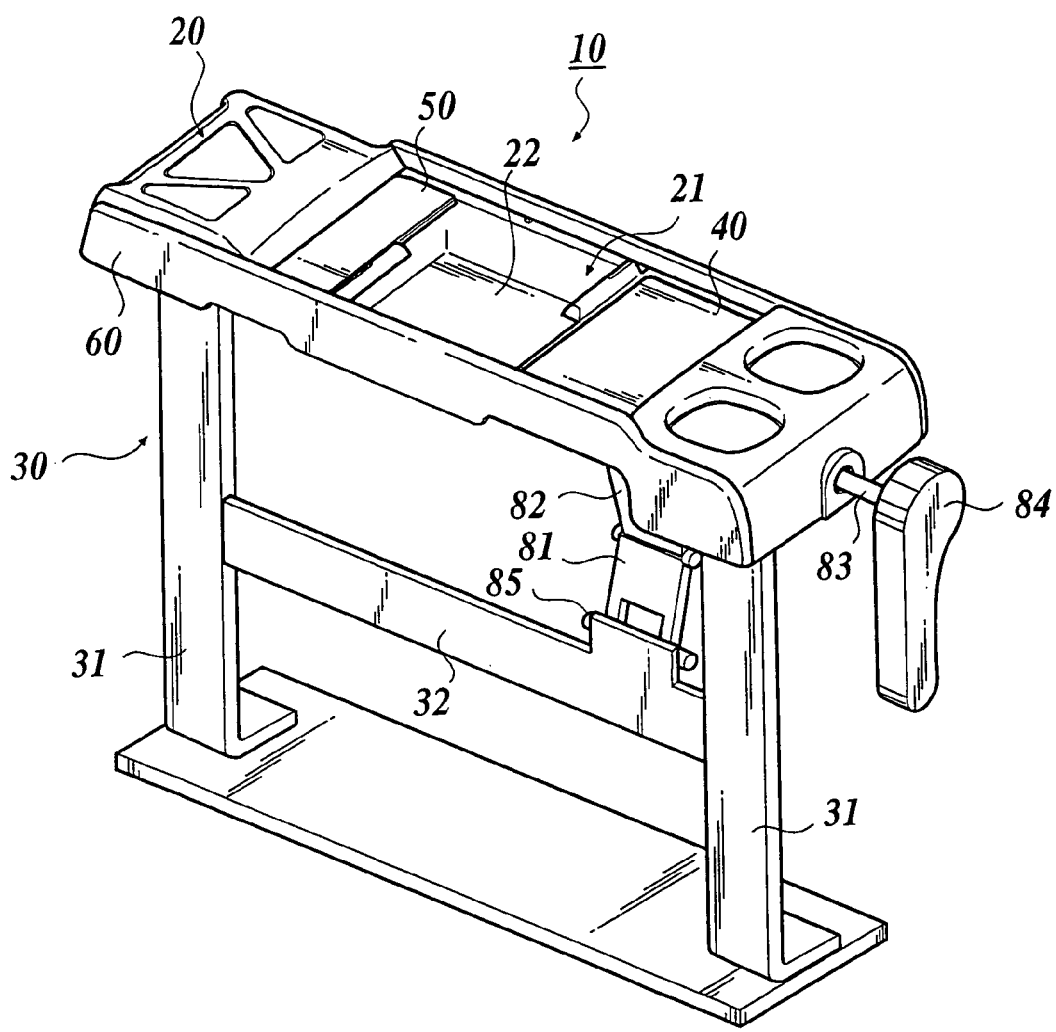
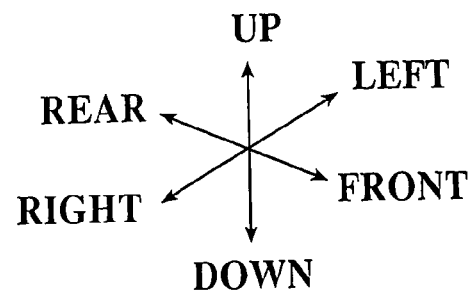

FIG.8
RELATED ART
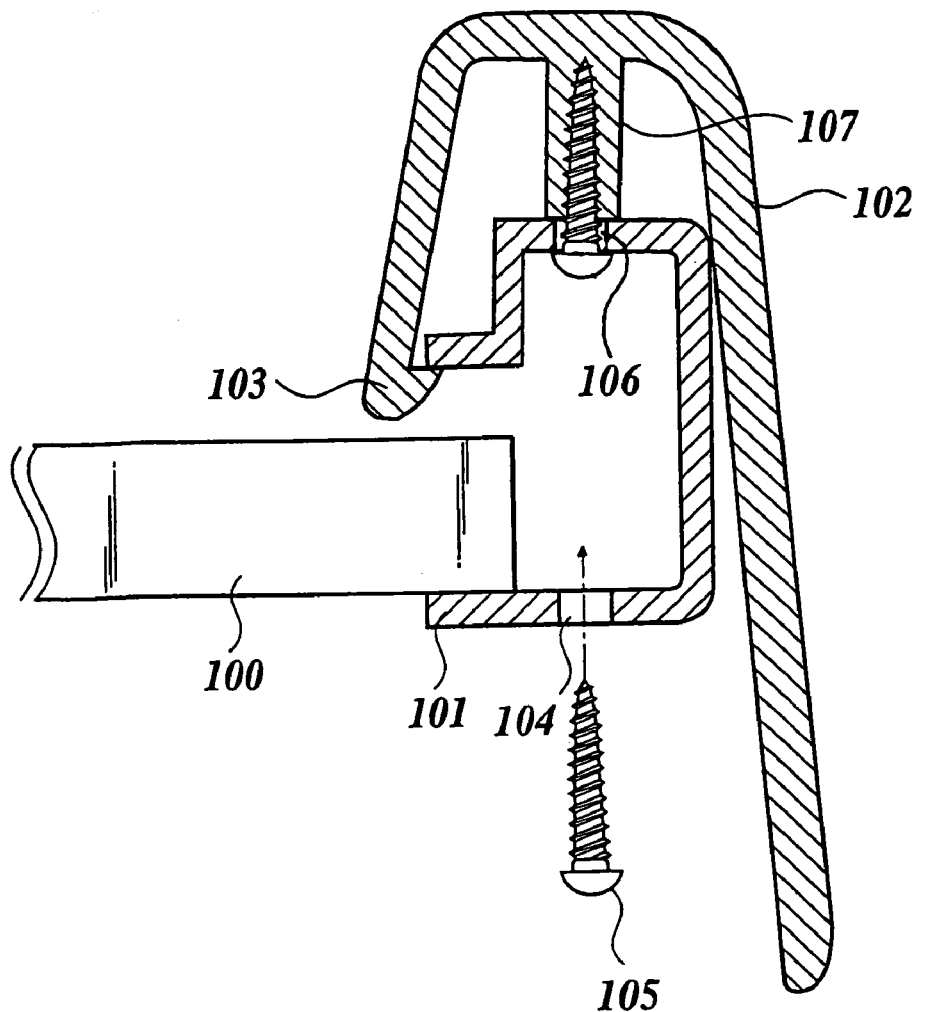
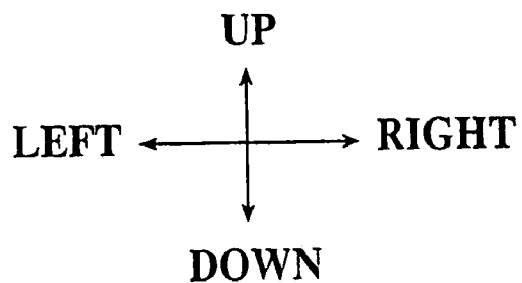

FIG.9
RELATED ART
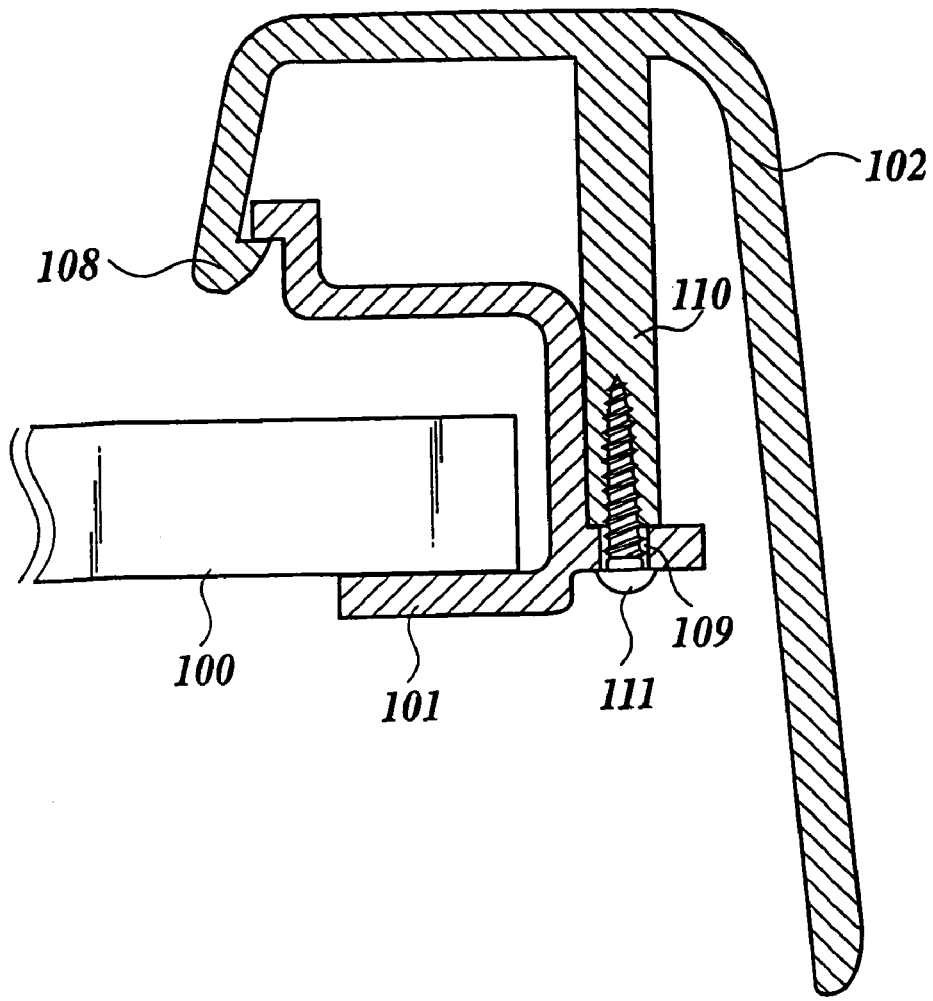
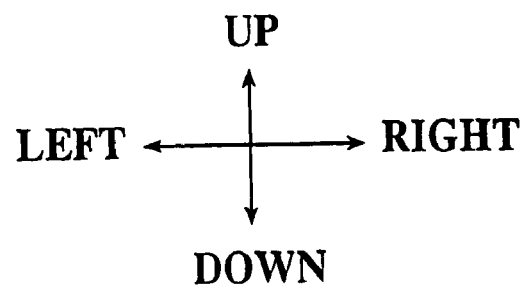

FIG.10
RELATED ART
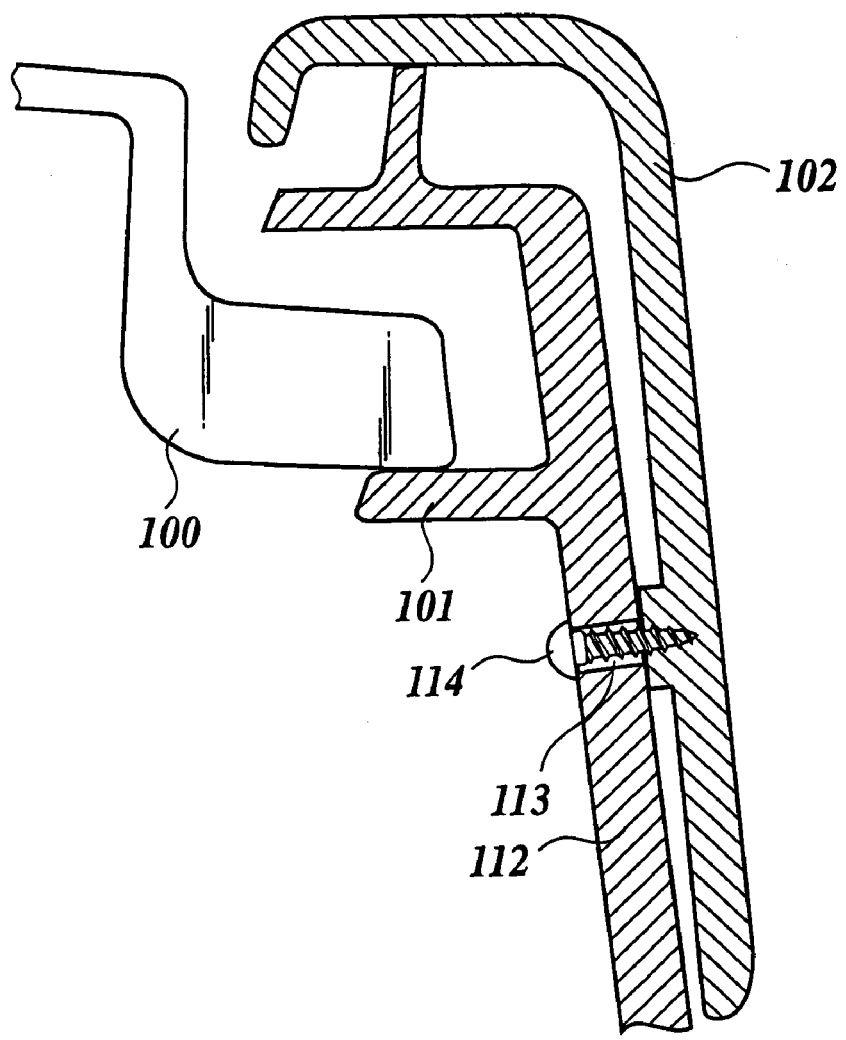
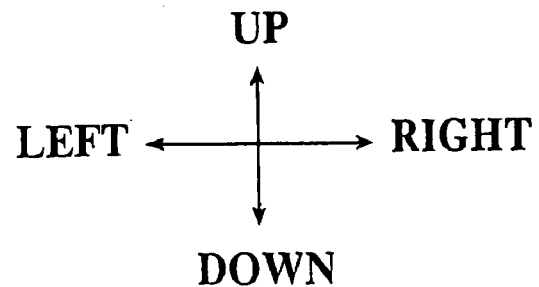

CENTER CONSOLE

BACKGROUND OF THE INVENTION

1. Field of the Invention

The present invention relates to a center console, particularly to a center console which permits a walk-through by folding and storing it when not in use.

2. Description of the Related Art

Recently, considering comfort and convenience in a vehicle, a walk-through to a rear seat is realized by configuring a center console which is attached between a driver seat and a passenger seat to be detachable or foldable.

For example, a folding center console which is held to be parallel to a horizontal surface in use and is rotated to be perpendicular to the horizontal surface to be stored when not in use has been known (For example, refer to JP-Tokukai-hei-7-315097A).

When providing a storing part for storing small articles in the folding center console, a cover (closing cover) for openably/closably covering an upper opening of the storing part needs to be provided to prevent the small articles from dropping from the storing part when the center console is folded.

FIGS. 8 to 10 show structures of a pair of right and left rail members 101 for supporting the closing cover 100 to be movable in back and forth direction (only the rail member 101 on the right side is shown in the drawings), and a frame body 102 for supporting the rail member 101.

FIG. 8 shows a structure in which a portion of the rail member 101 having a U shape in section is engaged at an engaging piece 103 with the frame body 102, and a screw 105 is inserted through a through hole 104 in the rear surface of the rail member 101 to be screwed in a bracket 107 provided at the frame body 102 through a through hole 106 in the upper surface of the rail member 101, so that the rail member 101 is fixed to the frame body 102.

FIG. 9 shows a structure in which a portion of the rail member 101 having a U shape in section is engaged with an engaging piece 108 provided at the frame body 102, the rear surface of the rail member 101 extends in a horizontal direction, and a screw 111 is screwed in a bracket 110 provided at the frame body 102 through a through hole 109 provided in the extending portion of the rail member 101.

FIG. 10 shows a structure in which the upper portion of the rail member 101 having a U shape in section is fixed to the inner surface of the frame body 102, and a screw 114 is screwed in the frame body 102 through a through hole 113 in a portion 112 extending downward from the rail member 101.

The structures shown in FIGS. 8 to 10 would raise a problem such as increasing the number of components of a center console or increasing manufacturing process, because a screw is used to fix the frame bodies to the rail members.

Also, the structures shown in FIGS. 8 and 9 would raise a problem to make the size in up and down direction and right and left direction large, respectively.

SUMMARY OF THE INVENTION

The present invention has been developed in view of the above described problems, and an object of the present invention is to provide a center console in which the number of components and manufacturing process can be reduced and downsizing can be accomplished.

In accordance with a first aspect of the present invention, the center console which is provided at a walk-through between right and left vehicle seats, and is held to be parallel to a horizontal surface in use and is rotatable so as to be vertical to the horizontal surface when not in use, comprises:

a storing part having an opening at an upper portion;

a cover for closably covering the opening;

a pair of right and left rail members to support the cover slidably in back and forth direction; and a pair of right and left frame bodies for supporting the rail members, wherein each of the frame bodies comprises: a side surface portion which covers a side surface of each of the rail members; and an extending portion which extends inwardly from an upper end of the side surface portion and a tip end portion of which is bent downward, the side surface portion including a lower engaging piece to engage with a lower portion of one of the rail members, and the portion bent downward including an upper engaging piece to engage with an upper portion of one of the rail members.

According to the first aspect of the invention, the side surface portion comprises the lower engaging piece which engages with the lower portion of the rail member, and the portion bent downward comprises the upper engaging piece which engages with the upper portion of the rail member. Thus, there is no need to use a screw for fixing the rail member to the frame body as the earlier developed center console, so that reduction of the number of the components and manufacturing process of the center console can be realized. Also, there is no need to provide a bracket at the frame body for being screwed shut, so that the size of the frame body in up, down, right and left directions can be small, thereby minimizing the center console while keeping enough capacity of the storing part.

Preferably, a projecting part is provided at one of the frame bodies and the rail members, a notch is provided at the other thereof, and each of the rail members is positioned to each of the frame bodies in back and forth direction by engaging the projecting part with the notch.

Accordingly, by engaging the projecting part with the notch, the rail member can be positioned to the frame body in back and forth direction, enabling to improve workability of the assembling work of the center console.

Preferably, each of the rail members sandwiches and holds the cover from up and down direction at one of both right and left edges to support the cover slidably in back and forth direction.

Preferably, the cover comprises a front cover part for closably covering a front side of the opening and a rear cover part for closably covering a rear side of the opening.

Accordingly, the number of components and manufacturing process of the center console can be reduced and downsizing of the center console can be accomplished.

BRIEF DESCRIPTION OF THE DRAWINGS

The present invention will become more fully understood from the detailed description given hereinafter and the accompanying drawings which are given by way of illustration only, and thus are not intended as a definition of the limits of the present invention, and wherein;

FIG. 3 is a perspective view showing a main portion of a structure of the center console;

FIG. 8 is a front view showing a main portion of a structure of a frame body and a rail member of an earlier developed technique;

FIG. 9 is a front view showing a main portion of a structure of a frame body and a rail member of an earlier developed technique; and FIG. 10 is a front view showing a main portion of a structure of a frame body and a rail member of an earlier developed technique.

DETAILED DESCRIPTION OF THE PREFERRED EMBODIMENTS

Figure 1:
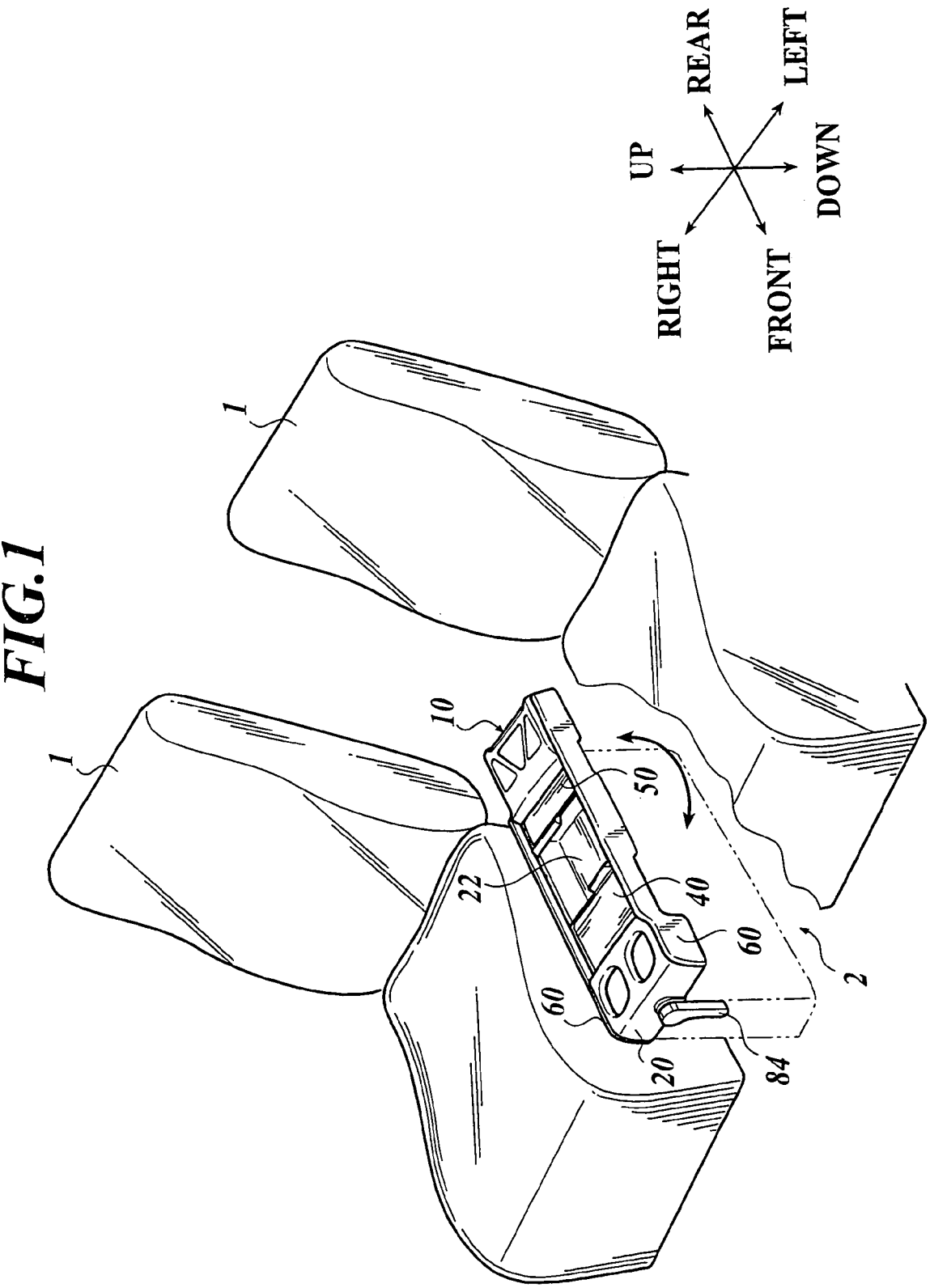
FIG. 1 is a perspective view showing a main portion of a center console in a horizontal state.

The embodiment for embodying the present invention will be explained referring to the drawings below.

Figure 2:
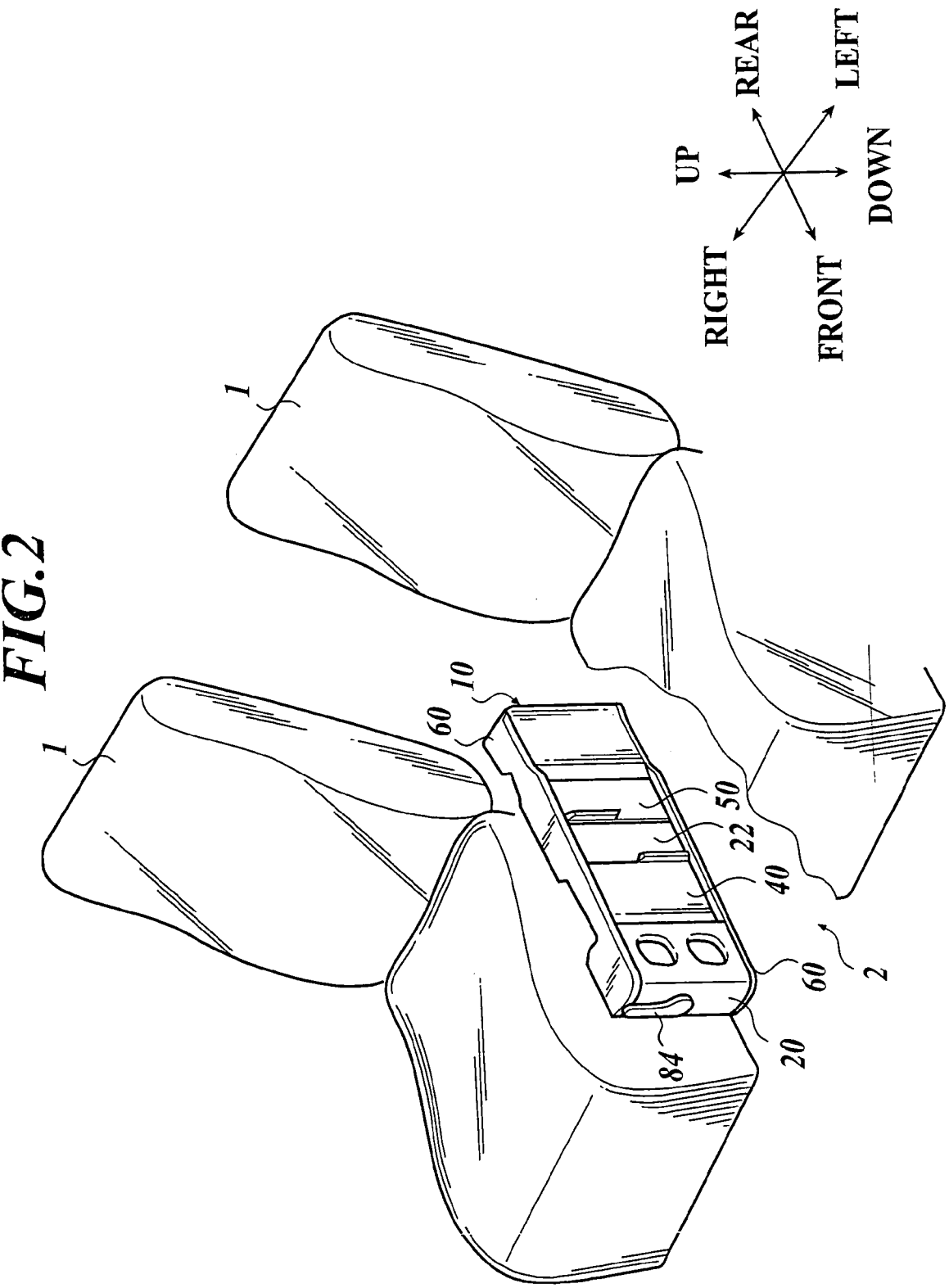
FIG. 2 is a perspective view showing a main portion of the center console in a vertical state.

As shown in FIG. 1, a center console 10 is provided at a walk-through portion 2, that is, between two right and left vehicle seats 1. The center console 10 is held to be parallel to the horizontal surface in use, and is rotatable so as to be vertical to the horizontal surface when not in use as shown in FIG. 2.

Specifically, as shown in FIG. 3, the center console 10 comprises a top plate 20 having a space inside thereof, a supporting member 30 for rotatably supporting the top plate 20 and the like.

The supporting member 30 comprises two front and rear vertical members 31 which are fixed to be vertical to the floor of the vehicle, and a horizontal member 32 which is crossed between the vertical members 31.

A storing part 22 having an opening 21 at the top portion thereof is formed on the top plate 20. The front side of the opening 21 is openably/closably covered by a front closing cover part 40, and the rear side of the opening 21 is openably/closably covered by a rear closing cover part 50.

Figure 4:
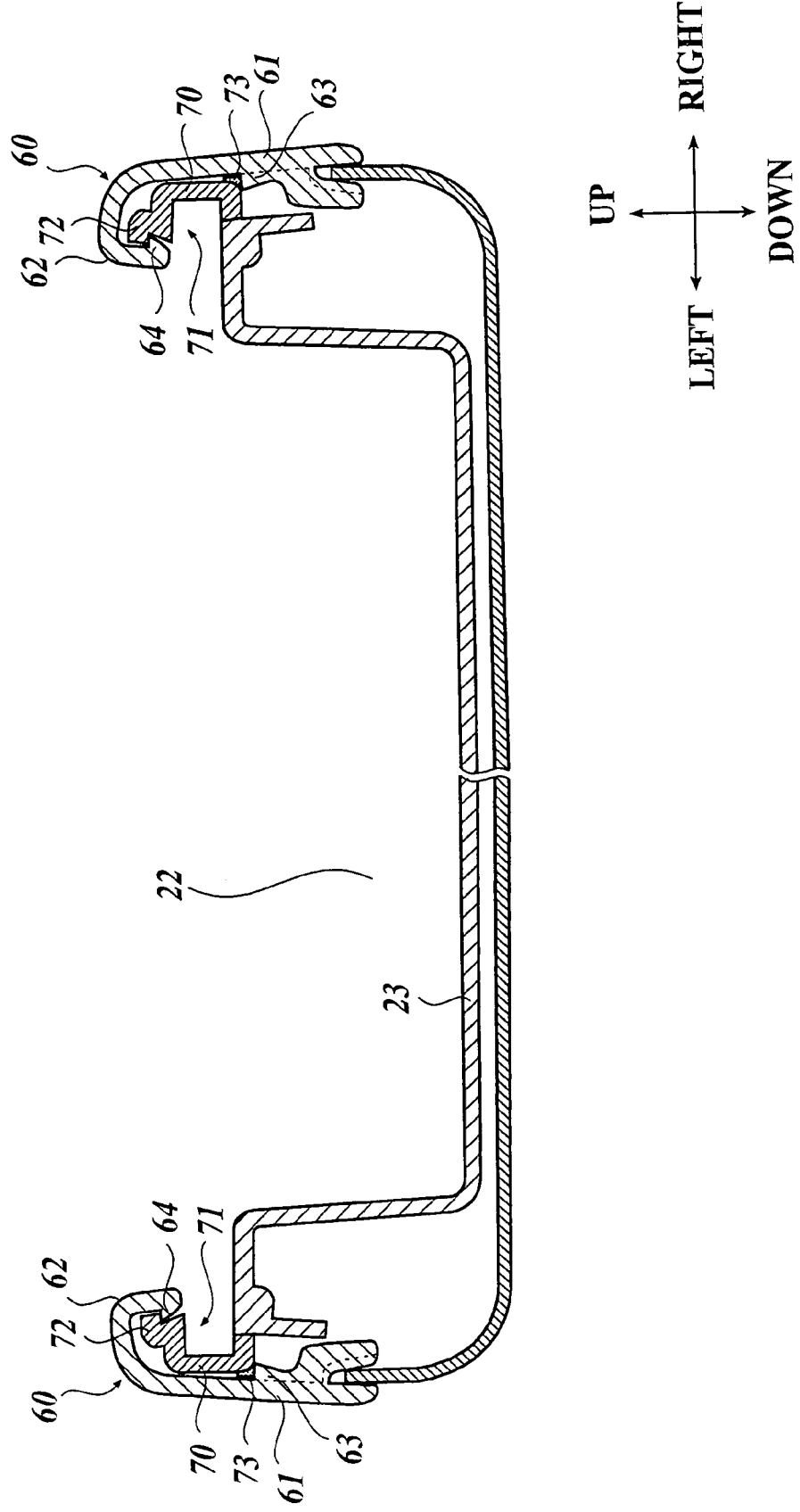
FIG. 4 is a front view showing a structure of a frame body and a rail member.

As shown in FIG. 4, there are frame bodies 60 as a cover and rail members 70 for supporting the closing cover parts 40 and 50 slidably in back and forth direction attached to the right and left sides of the top plate 20.

The rail member 70 is a member having a U shape in section, and is fixed to the interior side of the frame body 60. Both right and left edges of the closing cover parts 40 and 50 are engaged in the inside of the openings 71 of the rail members 70, so that the closing cover parts 40 and 50 are sandwiched and held from up and down direction at right and left edges thereof. The configuration is such that the closing cover parts 40 and 50 are slidable in back and forth direction. The rail member 70 comprises a plurality of upper projecting portions 72 each projecting inwardly from the upper surface thereof, and a plurality of lower projecting portions 73 each projecting outwardly from the lower surface thereof. The upper and lower projecting portions 72 and 73 are provided at predetermined intervals in a longitudinal direction, respectively.

In FIG. 4, the closing cover parts 40 and 50 are not shown. A box-shaped member 23 is attached to the lower portion of the rail members 70, which is to be a bottom and side surfaces of the storing part 22.

Each frame body 60 comprises a side surface portion 61 which covers a side surface of the rail member 70, and an extending portion 62 which extends from the upper end of the side surface portion 61 to the inside and a tip end of which is bent downward. A lower engaging piece 63 which engages with the lower projecting portion 73 is provided at the side surface portion 61, and an upper engaging piece 64 which engages with the upper projecting portion 72 is provided at a bending portion of the extending portion 62.

Figure 5:
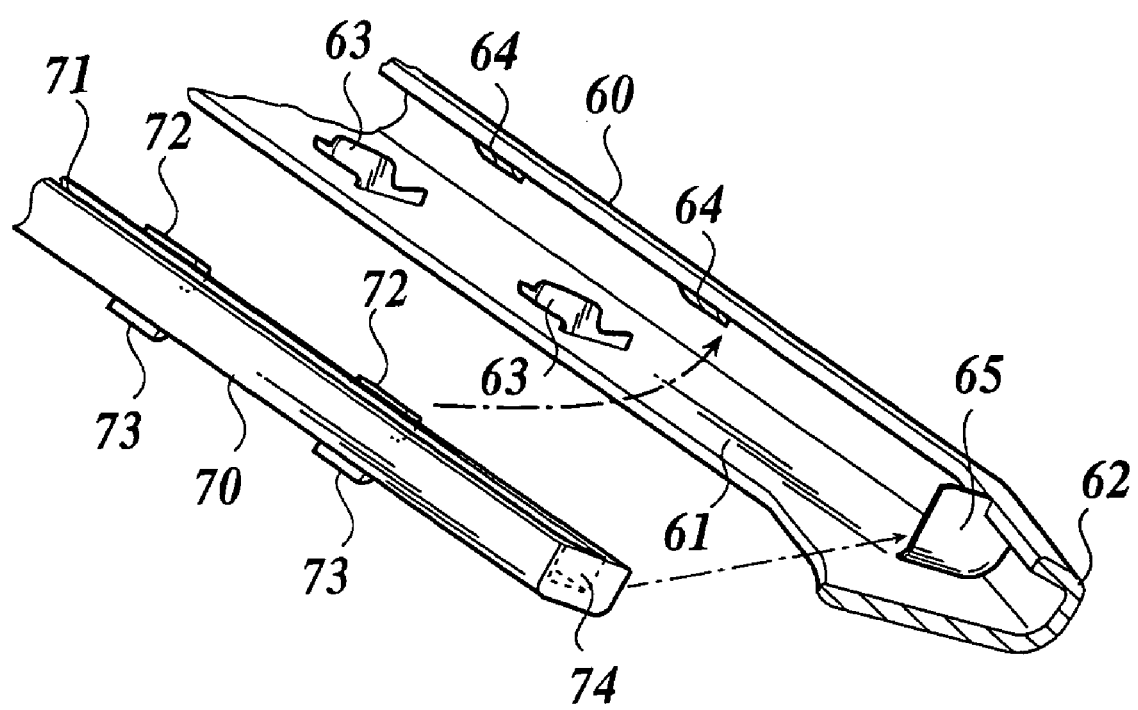
FIG. 5 is a perspective view showing a main portion of a structure of the frame body and the rail member.

As shown in FIG. 5, a plate-like projecting part 65 is formed near the front end of the frame body 60, and a notch 74 is formed near the front end of the rail member 70.

When attaching the rail member 70 to the frame body 60, first, a worker makes the projecting part 65 of the frame body 60 be engaged in the notch 74 of the rail member 70 for positioning the rail member 70 in back and forth direction. Next, the rail member 70 is pushed in the frame body 60 while elastically deforming the extending portion 62 in a state where the upper portion of the rail member 70 contacts the inner surface of the extending portion 62 of the frame body 60, thereby engaging the upper and lower projecting portions 72 and 73 with the upper and lower engaging pieces 64 and 63, respectively. Since the upper end portion of the lower engaging piece 63 is notched, the rail member 70 can be smoothly moved in the frame body 60.

A rotation mechanism 80 for rotating the center console 10 from the horizontal state to the vertical state is same as that of a general center console in an earlier developed technique, so that the detailed explanation thereof is omitted. The rotation mechanism 80 is schematically configured by comprising a first arm 81, a second arm 82, a connecting bar 83, a lever 84 and the like as shown in FIGS. 6 and 7.

The first arm 81 is connected to a rotary shaft 85 which is fixed to the horizontal member 32 at the lower end thereof, and to a lower end of the second arm 82 at the upper end thereof. A spring 86 is attached to the rotary shaft 85, and the first arm 81 is rotatable in a state of being biased clockwise in FIG. 6 by the spring 86 around the rotary shaft 85 as a center.

The second arm 82 is connected to the upper end of the first arm 81 at the lower end thereof as described above, and is fixed to the connecting bar 83 which extends in back and forth direction at the upper end thereof. The connecting bar 83 is supported by a portion of the top plate 20 to be rotatable around an axis thereof, and a lever 84 is attached to the front end of the connecting bar 83.

Figure 6:
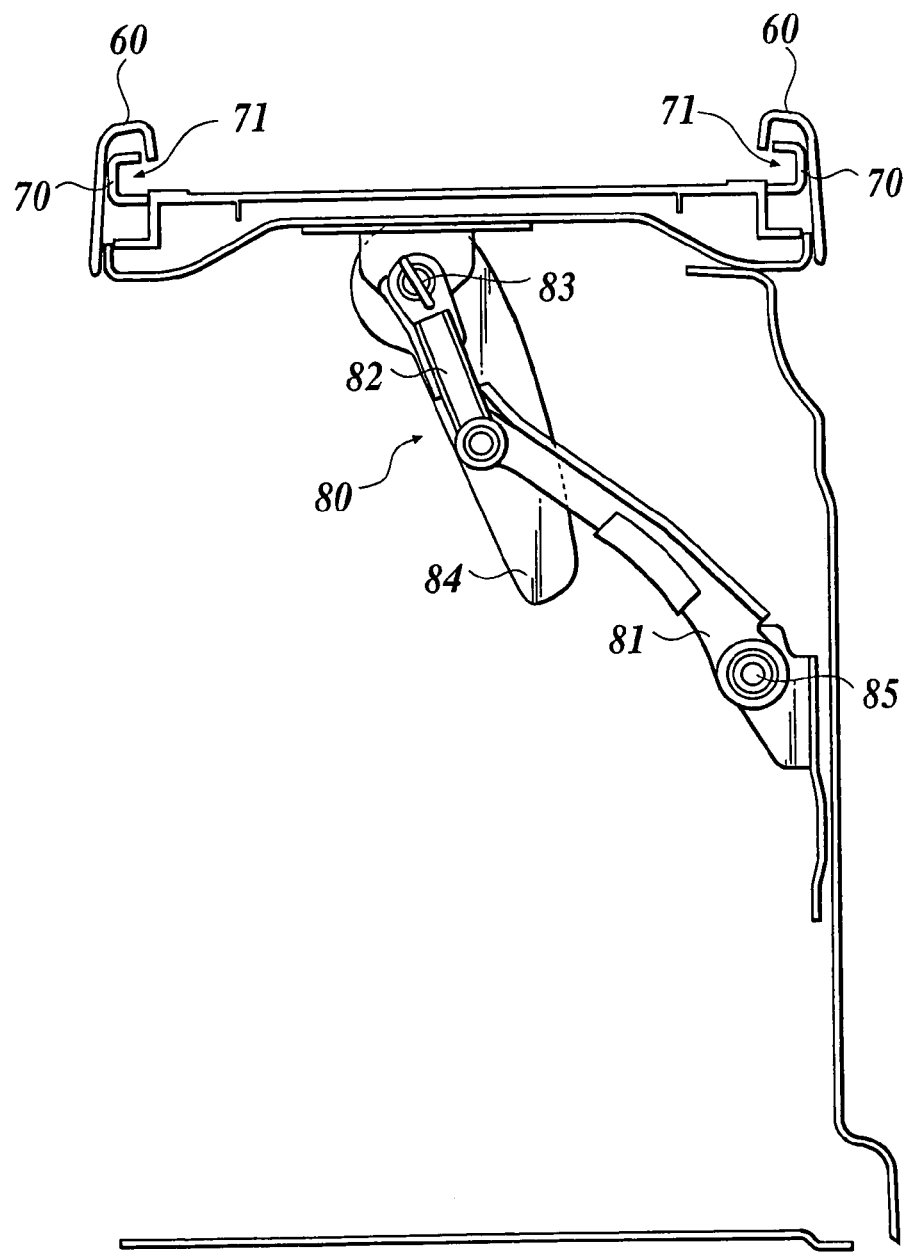
FIG. 6 is a back view showing a main portion of a structure of the center console.
Figure 7:
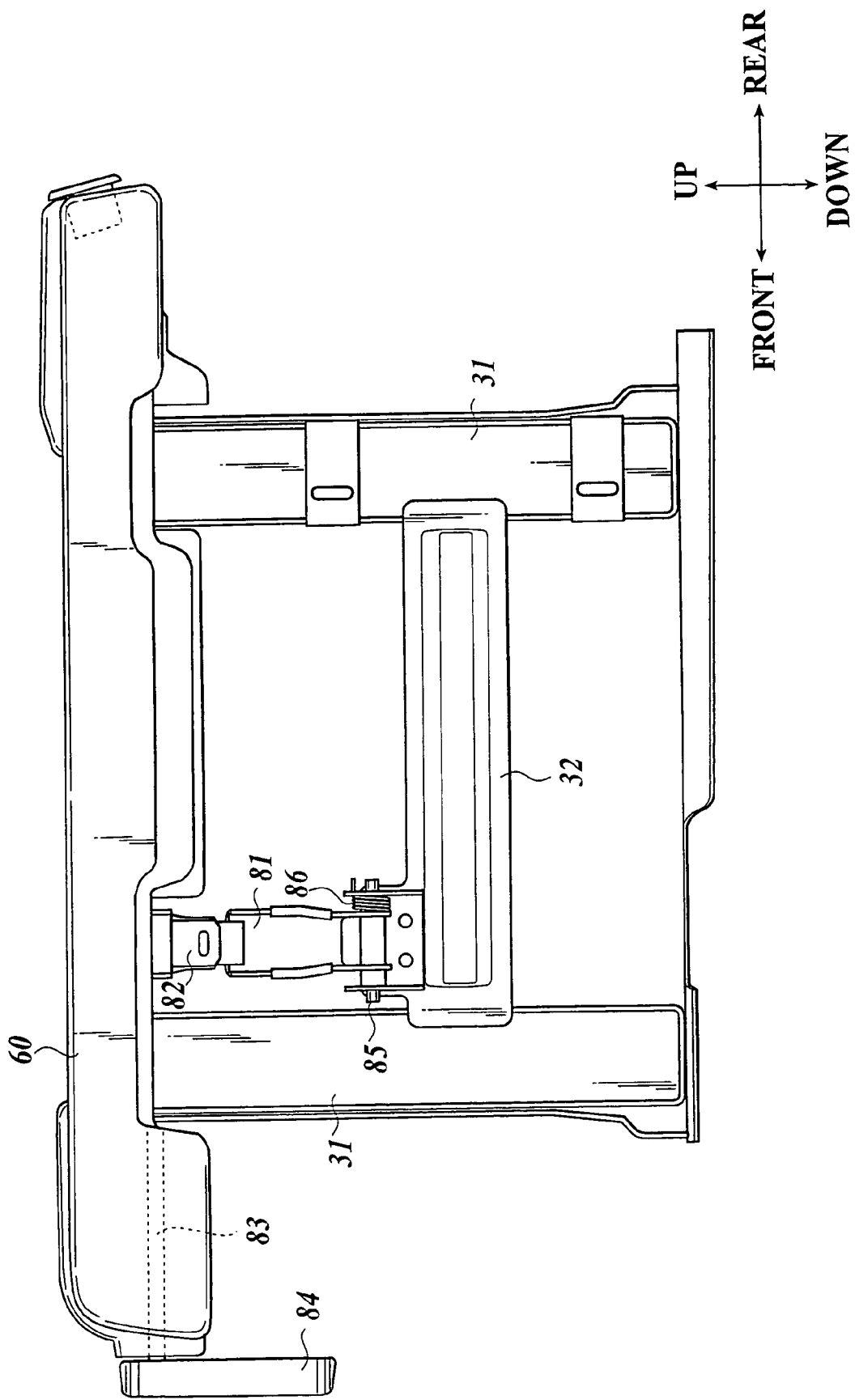
FIG. 7 is a side view showing a main portion of a structure of the center console.

As shown in FIG. 6, the connection part of the first and second arms 81 and 82 is at a position which is lower than the line connecting the lower end of the first arm 81 and the upper end of the second arm 82 in a state that the center console 10 is held to be parallel to the horizontal surface, so that the load from the top plate 20 is transmitted toward the floor through the vertical member 31.

When the lever 84 is rotated counterclockwise in FIG. 6 in this state, the torque from the lever 84 is transmitted to the second arm 82 through the connecting bar 83, and the second arm 82 rotates counterclockwise around the upper end thereof as a center. Thereby, the connection part of the first and second arms 81 and 82 moves to the position which is higher than the line connecting the lower end of the first arm 81 and the upper end of the second arm 82. Then, the first arm 81 which is biased by the spring 86 rotates clockwise around the rotary shaft 85 as a center, so that the center console 10 rotates to the position vertical to the horizontal surface and is stored to the side surface of the vehicle seat 1.

As described above, in the center console 10 described in this embodiment, the frame body 60 comprises the side surface portion 61 covering the side surface of the rail member 70 and the extending portion 62 which extends from the upper end of the side surface portion 61 to the inside and the tip end of which is bent downward. The side surface portion 61 comprises the lower engaging portion 63 engaging with the lower portion of the rail member 70 (lower projecting portion 73), and the bending portion comprises the upper engaging portion 64 engaging with the upper portion of the rail member 70 (upper projecting portion 72). Accordingly, there is no need to use a screw for fixing the rail member to the frame body as a center console in an earlier developed technique, so that reduction of the number of components and manufacturing process of the center console 10 can be realized. There is no need to provide a bracket at the frame body 60 or the rail member 70 for being screwed shut, so that the size of the frame body 60 in up, down, right and left directions can be small, thereby minimizing the center console 10 while keeping enough capacity of the storing part 22.

The frame body 60 is provided with the projecting part 65, and the rail member 70 is provided with the notch 74, so that the positioning of the rail member 70 to the frame body 60 can be performed by engaging the projecting part 65 with the notch 74, enabling to improve workability of the assembling work of the center console. The structure may be such that the frame body 60 is provided with the notch 74 and the rail member 70 is provided with the projecting part 65.

The entire disclosure of Japanese Patent Application No. Tokugan 2003-356853 which was filed on Oct. 16, 2003 including specification, claims, drawings and summary are incorporated herein by reference in its entirety.

What is claimed is:

1. A center console which is provided at a walk-through between right and left vehicle seats, and is held to be parallel to a horizontal surface in use and is rotatable so as to be vertical to the horizontal surface when not in use, comprising:
    a storing part having an opening at an upper portion;
    a cover for closably covering the opening;
    a pair of right and left rail members to support the cover slidably in back and forth direction; and
    a pair of right and left frame bodies for supporting the rail members, wherein each of the frame bodies comprises: a side surface portion which covers a side surface of each of the rail members; and an extending portion which extends inwardly from an upper end of the side surface portion and a tip end portion of which is bent downward,
    wherein the side surface portion comprises lower engaging piece horizontally extending from the side surface portion, one of the rail members engaging with the lower engaging piece by contacting a lower portion of the one rail member with an upper surface of the lower engaging piece, and
    wherein the extending portion comprises an upper engaging piece horizontally extending from the tip end portion, the one rail member engaging with the upper engaging piece by contacting an upper portion of the one rail member with an upper surface of the upper engaging piece.

2. The center console as claimed in claim 1, wherein a projecting part is provided at one of the frame bodies and the rail members, a notch is provided at the other thereof, and each of the rail members is positioned to each of the frame bodies in back and forth direction by engaging the projecting part with the notch.

3. The center console as claimed in claim 1, wherein each of the rail members sandwiches and holds the cover from up and down direction at one of both right and left edges to support the cover slidably in back and forth direction.

4. The center console as claimed in claim 2, wherein each of the rail members sandwiches and holds the cover from up and down direction at one of both right and left edges to support the cover slidably in back and forth direction.

5. The center console as claimed in claim 1, wherein the cover comprises a front cover part for closably covering a front side of the opening and a rear cover part for closably covering a rear side of the opening.

6. The center console as claimed in claim 2, wherein the cover comprises a front cover part for closably covering a front side of the opening and a rear cover part for closably covering a rear side of the opening.

7. The center console as claimed in claim 3, wherein the cover comprises a front cover part for closably covering a front side of the opening and a rear cover part for closably covering a rear side of the opening.

8. The center console as claimed in claim 4, wherein the cover comprises a front cover part for closably covering a front side of the opening and a rear cover part for closably covering a rear side of the opening.

9. A center console which is provided at a walk-through between right and left vehicle seats, and is held to be parallel to a horizontal surface in use and is rotatable so as to be vertical to the horizontal surface when not in use, comprising:
    a storing part having an opening at an upper portion;
    a cover for closably covering the opening;
    a rail member to support the cover to be slidable; and
    a frame body for supporting the rail member, wherein the frame body comprises: a side surface portion which covers a side surface of the rail member; and an extending portion which extends inwardly from an upper end of the side surface portion and a tip end portion of which is bent downward,
    wherein the side surface portion comprises a lower engaging piece horizontally extending from the side surface portion, one of the rail members engaging with the lower engaging piece by contacting a lower portion of the one rail member with an upper surface of the lower engaging piece, and
    wherein the extending portion comprises an upper engaging piece horizontally extending from the tip end portion, the one rail member engaging with the upper engaging piece by contacting an upper portion of the one rail member with an upper surface of the upper engaging piece.

* * * * *